United States Patent
Iwachido et al.

(10) Patent No.: US 8,938,953 B2
(45) Date of Patent: Jan. 27, 2015

(54) EXHAUST GAS PURIFYING METHOD

(75) Inventors: Kinichi Iwachido, Aichi (JP); Ken Tanabe, Okazaki (JP); Takayuki Onodera, Toyota (JP); Masanori Ide, Nagoya (JP); Hiroaki Ohhara, Anjo (JP); Mariko Ono, Himeji (JP); Akihisa Okumura, Himeji (JP); Masao Hori, Himeji (JP)

(73) Assignees: Mitsubishi Jidosha Kogyo Kabushiki Kaisha, Tokyo (JP); ICT Co., Ltd., Osaka (JP); Umicore Shokubai Japan Co., Ltd., Auburn Hills, MI (US)

( * ) Notice: Subject to any disclaimer, the term of this patent is extended or adjusted under 35 U.S.C. 154(b) by 612 days.

(21) Appl. No.: 12/607,420

(22) Filed: Oct. 28, 2009

(65) Prior Publication Data
    US 2010/0101212 A1    Apr. 29, 2010

(30) Foreign Application Priority Data

Oct. 29, 2008 (JP) ............... P.2008-278900

(51) Int. Cl.
    *F01N 3/10*    (2006.01)
    *F01N 3/08*    (2006.01)
    (Continued)

(52) U.S. Cl.
    CPC .......... *F01N 3/0842* (2013.01); *B01D 53/9422* (2013.01); *B01D 53/945* (2013.01);
    (Continued)

(58) Field of Classification Search
    USPC ............ 60/274, 285, 286, 295, 301; 422/170, 422/171, 177; 502/304, 325, 328, 330, 339; 423/213.5, 239.1, 239.2
    See application file for complete search history.

(56) References Cited

U.S. PATENT DOCUMENTS 6,293,095 B1 * 9/2001 Yamamoto et al. ............. 60/286
6,517,784 B1 2/2003 Iizuka et al.
(Continued)

FOREIGN PATENT DOCUMENTS

DE    196 00 552 A1    7/1996
DE    103 00 408 A1    7/2004
(Continued)

OTHER PUBLICATIONS

Chinese Office Action Issued Oct. 25, 2011 and English Translation.
Japanese Office Action issued in Japanese Patent Application No. 2008-278900 on May 30, 2012.
German Office Action issued in German Patent Application No. 10 2009 051 234.9 on Jul. 12, 2013.

*Primary Examiner* — Thomas Denion
*Assistant Examiner* — Patrick Maines
(74) *Attorney, Agent, or Firm* — Birch, Stewart, Kolasch & Birch, LLP

(57) ABSTRACT

A method of purifying an exhaust gas, includes: disposing a NOx trapping catalyst in an exhaust pipe of an internal combustion engine, the NOx trapping catalyst including: a metal substrate including cells, a corner portion of each of cells having an acute angle; and a catalyst layer supported in the metal substrate and including a noble metal, a heat-resistant inorganic oxide and a NOx trapping material, the catalyst layer having pores formed by addition of a pore formation promoting material, and the NOx trapping catalyst: adsorbing NOx in the exhaust gas when an exhaust air-fuel ratio is in a lean state; and desorbing and reducing the adsorbed NOx when the exhaust air-fuel ratio is in a stoichiometric state or a rich state; and removing the NOx by the exhaust air-fuel ratio being shifted between the lean state and the rich state.

9 Claims, 24 Drawing Sheets

(51) Int. Cl.
  *B01D 53/94* (2006.01)
  *B01J 23/58* (2006.01)
  *B01J 23/63* (2006.01)
  *B01J 37/02* (2006.01)
  *F01N 13/00* (2010.01)
  *B01J 35/00* (2006.01)
  *B01J 35/04* (2006.01)

(52) U.S. Cl.
  CPC ............... *B01J 23/58* (2013.01); *B01J 23/63* (2013.01); *B01J 37/0246* (2013.01); *F01N 3/0807* (2013.01); *F01N 3/101* (2013.01); *F01N 13/009* (2014.06); *B01D 53/9477* (2013.01); *B01D 2255/1021* (2013.01); *B01D 2255/2022* (2013.01); *B01D 2255/204* (2013.01); *B01D 2255/206* (2013.01); *B01D 2255/20707* (2013.01); *B01D 2255/50* (2013.01); *B01D 2255/91* (2013.01); *B01D 2255/9205* (2013.01); *B01D 2258/012* (2013.01); *B01D 2258/014* (2013.01); *B01J 35/0013* (2013.01); *B01J 35/04* (2013.01); *F01N 2370/02* (2013.01); *Y02T 10/22* (2013.01); *Y02T 10/24* (2013.01)
  USPC .................. 60/301; 60/274; 60/285; 60/286

(56) References Cited

U.S. PATENT DOCUMENTS

| | | | |
|---|---|---|---|
| 7,438,866 B2 | 10/2008 | Iizuka et al. | |
| 7,448,201 B2 | 11/2008 | Kaiser | |
| 2003/0091499 A1* | 5/2003 | Becue et al. | 423/593 |
| 2003/0223921 A1* | 12/2003 | Hsu | 422/180 |
| 2004/0071609 A1* | 4/2004 | Bruck | 422/171 |
| 2004/0115104 A1* | 6/2004 | Iizuka et al. | 422/177 |
| 2004/0237512 A1* | 12/2004 | Tang et al. | 60/295 |
| 2005/0217243 A1* | 10/2005 | Kamoto et al. | 60/277 |
| 2006/0008399 A1* | 1/2006 | Feinstein | 422/222 |
| 2006/0168949 A1* | 8/2006 | Xu et al. | 60/295 |
| 2006/0272318 A1* | 12/2006 | Tanabe et al. | 60/286 |
| 2008/0264010 A1* | 10/2008 | Mizuno et al. | 55/350.1 |

FOREIGN PATENT DOCUMENTS

| | | |
|---|---|---|
| JP | 2003-62464 A | 3/2003 |
| JP | 2003-200063 A | 7/2003 |
| JP | 2003-326170 A | 11/2003 |
| JP | 2005-296758 A | 10/2005 |
| JP | 2006-297237 A | 11/2006 |
| WO | WO-02/062468 A1 | 8/2002 |

* cited by examiner

EXHAUST GAS PURIFYING METHOD

BACKGROUND OF THE INVENTION

1. Field of the Invention

The present invention relates to an exhaust gas purifying method for purifying exhaust gases emitted from an internal combustion engine by removing NOx contained therein.

2. Description of the Related Art

As internal combustion engines advantageous in reduction of fuel consumption, there are known lean burning internal combustion engines on which an air-fuel ratio is controlled to be on the lean side of the stoichiometric air-fuel ratio and direct injection internal combustion engines in which fuel is injected directly into combustion chambers for lean burning (hereinafter, referred to generally as lean-burn engines). In the lean-burn engine which runs leaner than stoichiometric (lean operation) to improve fuel economy, an exhaust gas purifying catalyst (a NOx trapping catalyst) is provided for purifying exhaust gases through reduction of NOx (oxides of nitrogen) therein.

The NOx trapping catalyst is made as a catalyst having characteristics in which NOx in exhaust gases is adsorbed as nitrate X—NO3 in an oxidation atmosphere (a lean air-fuel ratio) in which the concentration of reductants is low and the NOx so adsorbed is reduced to N2 in a reduction atmosphere (a stoichiometric air-fuel ratio or a rich air-fuel ratio) in which a large amount of reductants such as CO (carbon monoxide) and HC (hydrocarbons) exists.

In the NOx trapping catalyst of this type, NOx in exhaust gases is adsorbed to be prevented from being emitted into the atmosphere by the engine running with the lean air-fuel ratio, and the NOx so adsorbed is then desorbed for reduction by controlling the air-fuel ratio to be shifted to the rich side periodically. In order to obtain such a function, in the NOx trapping catalyst, for example, noble metals such as platinum (hereinafter, abbreviated to Pt), palladium (hereinafter, abbreviated to Pd), and rhodium (hereinafter, abbreviated to Rh), a NOx trapping agent such as an alkaline metal or alkaline earth metal and a heat-resistant inorganic oxide such as alumina are supported in a honeycomb substrate formed from a ceramic material.

In recent years, in the lean-burn engines, in order to exhibit the merit thereof in terms of fuel economy, efforts have been made to expand the lean operation range. Because of this, there are appearing some lean-burn engines which now run lean of stoichiometric even at the time of acceleration for which engines used to run with the stoichiometric air-fuel ratio or rich air-fuel ratio. Since fuel is consumed much when the vehicle is accelerated, the fuel economy can be improved largely by executing the lean operation at the time of acceleration.

In the current situations in which the lean operation range is expanded, there exists an increasing demand for improvement in the performance of NOx trapping catalysts, and a high NOx purifying performance at high temperatures is now being demanded. In related-art a NOx trapping catalyst, an alkaline metal or alkaline earth metal (a NOx trapping agent) is supported in a substrate formed from a ceramic material such as cordierite.

When the lean operation range is expanded, the temperature of the catalyst is increased, and the NOx adsorption material tends to migrate easily as the temperature of the catalyst increases. As this occurs, it is considered that the NOx trapping material combines with the constituent of cordierite. When the NOx trapping material is combined with the constituent of cordierite, the amount of NOx trapping material in the catalyst layers is reduced, leading to a fear that the reduction performance of the NOx is reduced. Because of this, it has been studied to apply to the substrate in which the catalyst layers are supported a metal substrate in which no combination of the NOx material occurs even at high temperatures.

In a metal substrate, a large number of cells are formed by winding corrugated foils and flat foils into a spiral configuration. Because of this, in a NOx trapping catalyst using such a metal substrate, corner portions having an acute angle are produced in one cell, and it is inevitable that the catalyst layer becomes thick at the acute-angled corner portions. When thick portions are distributed over the catalyst layer, there is caused a fear that the diffusivity of exhaust gases is reduced at the thick portions of the catalyst layers, and it has currently been difficult to increase sufficiently the exhaust gas purifying performance (in particular, with respect to NOx).

As a related-art NOx trapping catalyst, there has been proposed a NOx trapping catalyst which has a catalyst active component which contains an alkaline metal or alkaline earth metal and substrates and in which particles of magnesium oxide or calcium oxide are contained between the substrates (for example, refer to WO2002/62468). The related art described in WO2002/62468 is such that by the particles of magnesium oxide or calcium oxide being so contained, the migration of the alkaline metal or alkaline earth metal is prevented at high temperatures physically and structurally and configures a technique in which the thermal deterioration can be suppressed even when such metal substrates are used.

SUMMARY OF THE INVENTION

It is therefore an object of the invention to provide an exhaust gas purifying method which can increase a purifying performance with respect to NOx even when a metal substrate is used.

In order to achieve the object, according to the invention, there is provided a method of purifying an exhaust gas, the method comprising:
disposing a NOx trapping catalyst in an exhaust pipe of an internal combustion engine,
the NOx trapping catalyst including:
a metal substrate including cells, a corner portion of each of cells having an acute angle; and
a catalyst layer supported in the metal substrate and including a noble metal, a heat-resistant inorganic oxide and a NOx trapping material, the catalyst layer having pores formed by addition of a pore formation promoting material, and
the NOx trapping catalyst:
adsorbing NOx in the exhaust gas when an exhaust air-fuel ratio is in a lean state; and
desorbing and reducing the adsorbed NOx when the exhaust air-fuel ratio is in a stoichiometric state or a rich state; and
removing the NOx by the exhaust air-fuel ratio being shifted between the lean state and the rich state.

The pore formation promoting material may be magnesia (MgO) whose particle size ranges from 0.1 μm to 3.0 μm.

The NOx trapping material may be an alkaline metal or an alkaline earth metal.

The alkaline metal or the alkaline earth metal may be potassium (K).

The catalyst layer may include zeolite which stabilizes the potassium (K).

The noble metal may be platinum (Pt), and the catalyst layer may include ceria (CeO2).

The catalyst layer may include titania which suppress poisoning by sulfur (S).

The internal combustion engine may be a direct injection type internal combustion engine in which fuel is injected directly in a combustion chamber for lean burning, a three-way catalyst may be disposed downstream of the NOx trapping catalyst, and a catalyst layer of the three-way catalyst may include a trapping material for the NOx trapping material.

According to the invention, there is also provided an exhaust purifying catalyst which is disposed in an exhaust pipe of an internal combustion engine, the exhaust purifying catalyst comprising:

a metal substrate including cells, a corner portion of each of cells having an acute angle; and a catalyst layer supported in the metal substrate and including a noble metal, a heat-resistant inorganic oxide and a NOx trapping material, the catalyst layer having pores formed by addition of a pore formation promoting material, wherein the exhaust purifying catalyst adsorbs NOx in an exhaust gas when an exhaust air-fuel ratio is in a lean state, and desorbs and reduces the adsorbed NOx when the exhaust air-fuel ratio is in a stoichiometric state or a rich state.

DETAILED DESCRIPTION OF THE INVENTION

Figure 1:
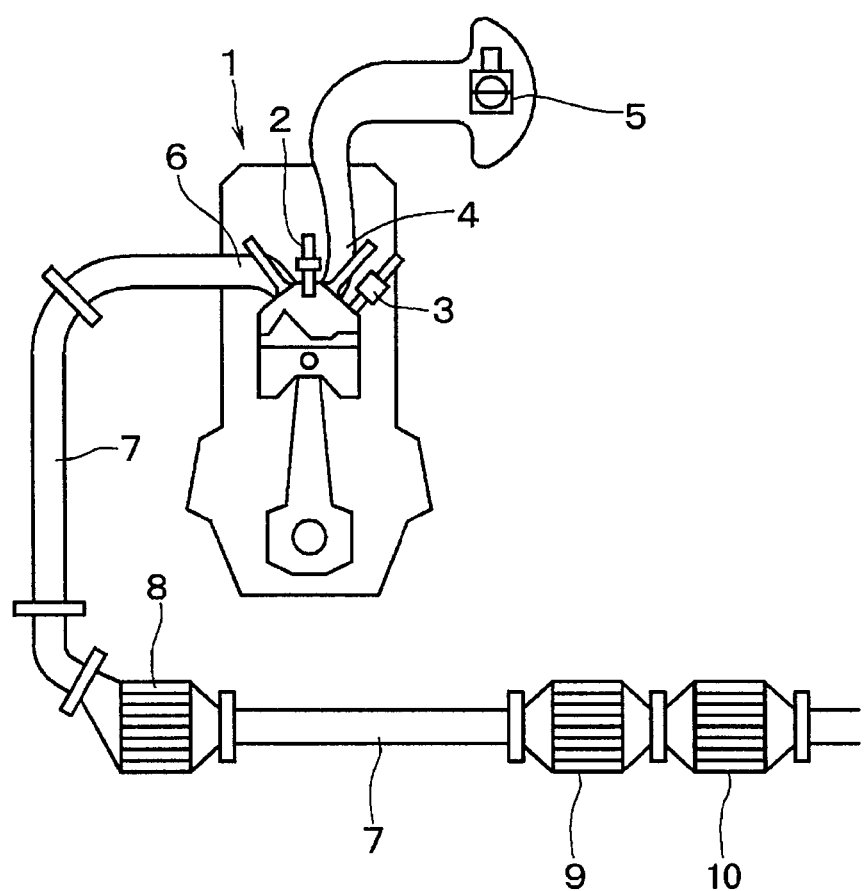
FIG. 1 is a schematic block diagram of an internal combustion engine which includes a NOx trapping catalyst which realizes an exhaust gas purifying method according to an embodiment of the invention.
Figure 2:
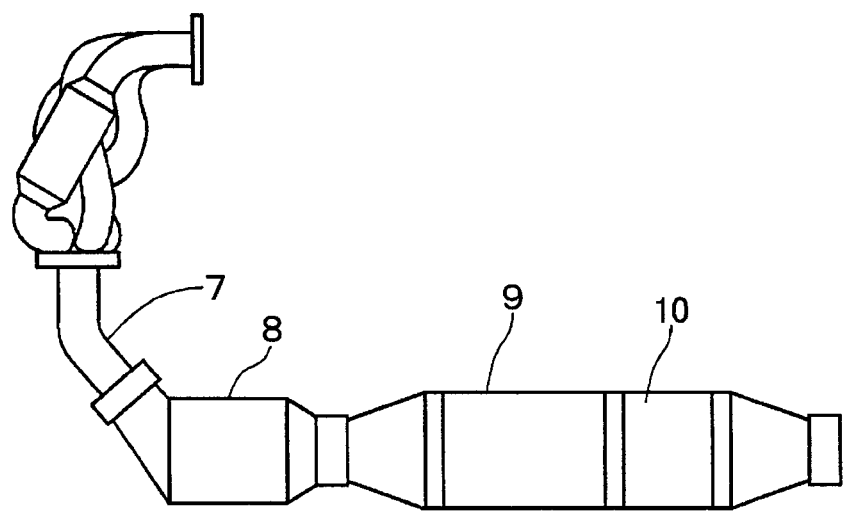
FIG. 2 is a conceptual diagram of an exhaust line.
Figure 3:
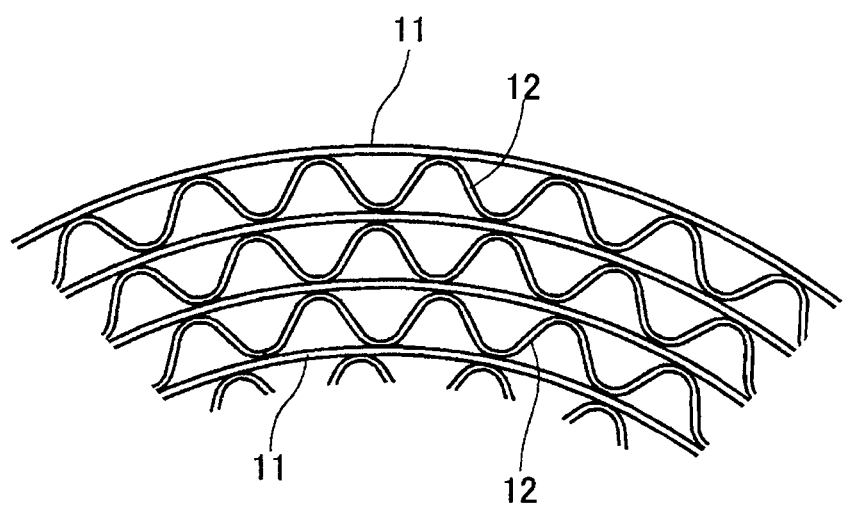
FIG. 3 is an explanatory diagram of a metal substrate.
Figure 4:
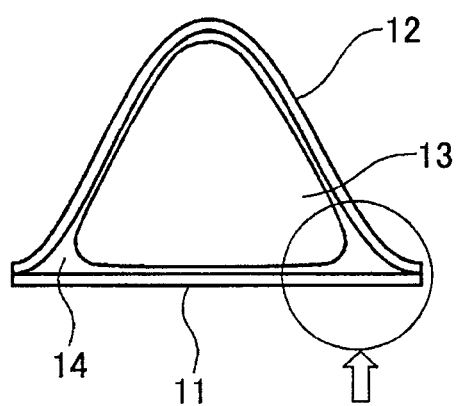
FIG. 4 is a sectional view of a cell in the metal substrate.
Figure 5:
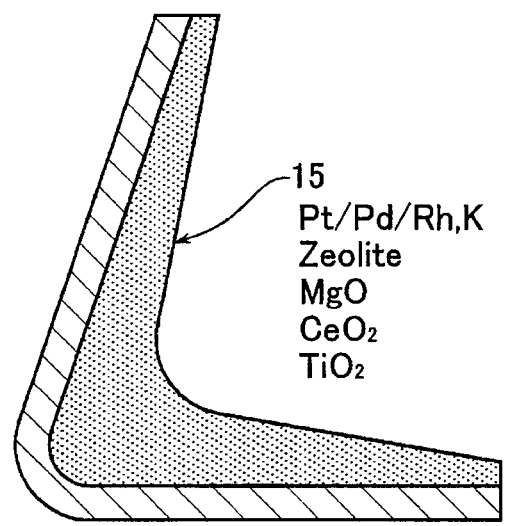
FIG. 5 is an exemplary and explanatory diagram of a catalyst layer of the NOx trapping catalyst which realizes the exhaust gas purifying method according to the embodiment of the invention.
Figure 6:
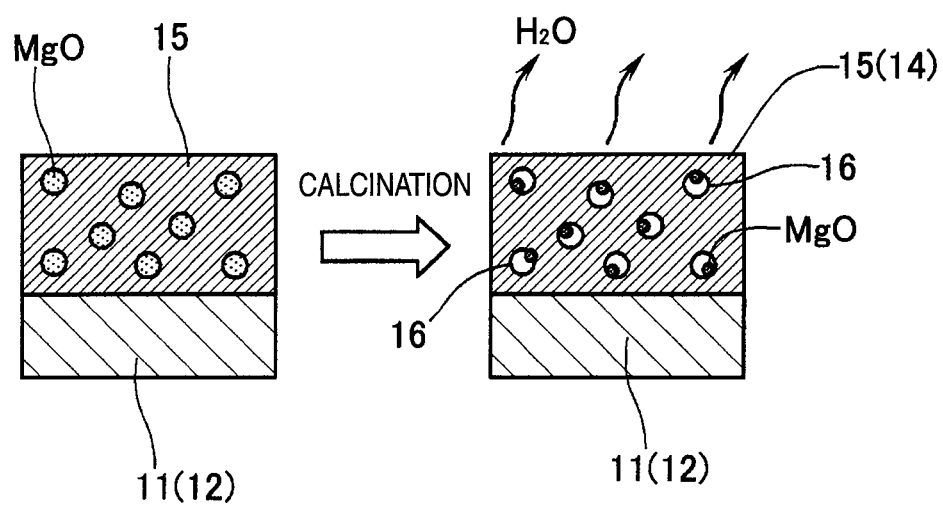
FIG. 6 is a conceptual diagram depicting the formation of pores.

FIG. 1 shows a schematic configuration of an embodiment of an internal combustion engine to which an exhaust gas purifying method according to the present invention is applied, FIG. 2 shows a concept of an exhaust line, FIG. 3 illustrates the configuration of a metal substrate, FIG. 4 shows a section of a cell of the metal substrate, FIG. 5 illustrates exemplarily a catalyst layer in a NOx trapping catalyst used in realizing the exhaust gas purifying method according to the embodiment of the invention, and FIG. 6 shows a concept of the formation of pores in the catalyst layer.

An internal combustion engine to which an exhaust gas purifying method according to an embodiment of the invention is applied will be described schematically based on FIGS. 1, 2.

As is shown in FIG. 1, an internal combustion engine 1 is configured as an in-cylinder direct injection type spark ignition multi-cylinder gasoline engine. A spark plug 2 and a fuel injection valve 3 are mounted for each cylinder in a cylinder head of the engine 1, and fuel is injected from the fuel injection valve 3 directly into a combustion chamber. An inlet port 4 is formed for each cylinder in the cylinder head in a substantially vertical direction, and the inlet port 4 is connected to a throttle valve 5 via an inlet manifold.

As is shown in FIGS. 1 and 2, an exhaust port 6 is formed in the cylinder head in a substantially horizontal direction, and an upstream exhaust pipe 7 is connected to the exhaust port 6 via an exhaust manifold. An upstream catalyst 8 is disposed on an upstream side of a downstream exhaust pipe 7, and a NOx trapping catalyst 9 is disposed on a downstream side of the downstream exhaust pipe 7.

In the NOx trapping catalyst 9, a catalyst layer including noble metals such as Pt, Pd and Rh, a heat-resistance inorganic oxide such as alumina, and a NOx trapping material such as an alkaline metal or an alkaline earth metal is supported on a metal substrate. As the NOx trapping material, K is preferably used which is an alkaline metal.

The NOx trapping catalyst 9 functions to adsorb NOx in exhaust gases as a nitrate X—NO3 when the exhaust air-fuel ratio is a lean air-fuel ratio and to desorb the adsorbed NOx to reduce the NOx to N2 when the exhaust air-fuel ratio is a stoichiometric air-fuel ratio or rich air-fuel ratio in which a large amount of reductants exists.

A three-way catalyst 10 is disposed on a downstream side of the NOx trapping catalyst 9. The three-way catalyst 10 contains noble metals such as Pt, Pd and Rh and zeolite as a trapping material for K, which is the NOx trapping material, and functions to purify exhaust gases to remove CO, HC and NOx which exist in the exhaust gases when the exhaust air-fuel ratio is near the stoichiometric air-fuel ratio.

The three-way catalyst 10 can be used in either a ceramic substrate or a metal substrate, and zeolite can be added only to a Pd layer as a noble metal.

The NOx trapping catalyst 9 will be described specifically based on FIGS. 3 to 6.

As is shown in FIGS. 3 and 4, a substrate for the NOx trapping catalyst 9 is formed by winding flat foils 11 and corrugated foils 12, which are both made of a JIS-specified stainless steel or SUS, are laminated into a spiral configuration, so that a large number of cells 13 are formed in the substrate. Because of this, corner portions of an acute angle are produced in one cell 13. A catalyst layer 14 is formed in an interior of the cell 13, and due to the acute-angled corner portions being produced in the cell 13, the catalyst layer 14 becomes thick at the corner portions (refer to a portion indicated by an arrow in FIG. 4).

Pores are formed in the catalyst layer 14, and such pores are formed as a result of calcining of MgO of a particle size ranging from 0.1 μm to 3.0 μm which is added as a pore formation promoting material. In this case, a condition is produced in the catalyst layer 14 in which many pores whose particle sizes range approximately from 1 μm to 10 μm are produced therein. An increase in the number of pores in the catalyst layer 14 can promote the diffusivity of exhaust gases in the cell 13 even though the catalyst layer 14 becomes thick at the acute-angled corner portions of the cell 13, thereby making it possible to maintain high the NOx reduction performance at the corner portions of the cell 13.

A condition will be described based on FIG. 5 in which a coat of slurry is applied to a wall of the cell 13 so as to form a catalyst layer 14.

As is shown in the figure, a slurry layer (a coating layer) 15 which is applied to the cell 13 contains a heat-resistant inorganic oxide such as alumina, noble metals such as Pt, Pd and Rh and a NOx trapping material such as an alkaline metal or an alkaline earth metal.

The amount of the noble metals is preferably in the range from 0.1 g/L to 15 g/L and is more preferably in the range from 0.5 g/L to 5 g/L. The amount of the heat-resistant inorganic oxide is preferably in the range from 10 g/L to 400 g/L and is more preferably in the range from 50 g/L to 300 g/L. The amount of the NOx trapping material is preferably in the range from 5 g/L to 50 g/L, and the amount of the NOx trapping material added in this embodiment is 25 g/L, for example.

K can preferably be used as the NOx trapping material. In this case, a performance particularly in a high temperature region can be increased. In addition, in a substrate formed from a ceramic material such as cordierite, K migrates to combine with cordierite at high temperatures to thereby reduce the strength of the substrate. However, in this embodiment, since the metal substrate made of the SUS is used, there occurs no such combination with K, whereby the strength of the substrate at high temperatures can be maintained.

5 g/L to 50 g/L zeolite is added to the coating layer 15 to stabilize K, and in this embodiment, for example, 10 g/L zeolite is added. 10 g/L to 100 g/L CeO2 is added to the coating layer 15 to increase the activity of Pt, and in this embodiment, for example, 20 g/L CeO2 is added. To suppress the poisoning by S, 1 to 50 g/L TiO2 is added to the coating layer 15, and in this embodiment, for example, 10 g/L TiO2 is added.

0.5 g/L to 10 g/L MgO whose particle size ranges from 0.1 μm to 3.0 μm is added to the coating layer 15 as a pore formation promoting material, and in this embodiment, for example, 3 g/L MgO is added. By MgO whose particle size ranges 0.1 μm to 3.0 μM being calcined, the volumes of MgO are reduced as is shown in FIG. 6, and the number of minute pores 16 ranging from 1 to 10 μm in pore size is increased.

The coating layer 15 is applied to the cells 13 in the metal substrate, which is then calcined (at temperatures 400° C. to 500° C.), whereby the coating layer 15 is transformed into a catalyst layer 14 in which the noble metals such as Pt, Pd and Rh and K are supported, and further, the catalyst layer 14 so formed then contains CeO2 and TiO2 which are supported therein. In addition, MgO whose particle size ranges from 0.1 μm to 3.0 μm is shrunk in the catalyst layer 14, whereby the catalyst layer 14 comes to contain minute pores 16 ranging from 1 μm to 10 μm in pore size.

In the NOx trapping catalyst 9 in which the minute pores 16 are provided in the catalyst layers 14, exhaust gases are allowed to flow through the minute pores 16 so as to promote the diffusivity of exhaust gases. In the metal substrate, although since the cells 13 have the acute-angled corner portions from the structure thereof, it is considered that the thickness of the coating layers 15 becomes uneven, by provision of the catalyst layers 14 which contain the minute pores 16, even though unevenness is produced in the thickness distribution of the catalyst layers 14, the diffusivity of exhaust gases can be promoted.

Because of this, the reduction activity of NOx can be executed effectively over the whole area of the catalyst layers 14, thereby making it possible to improve the NOx reduction performance largely.

A preparation method of the NOx trapping catalyst will be as follows, for example.

Water-soluble noble metal salts, heat-resistant inorganic oxide and water-soluble salt of alkaline metal and/or water-soluble salt of alkaline earth metal, MgO, zeolite, CeO2 and TiO2 are dissolved or dispersed in water, and the solution or dispersion is wet-milled into slurry. A metal substrate is immersed in the prepared slurry, and the metal substrate from which excess slurry has been removed is dried and calcined to obtain a NOx trapping catalyst. A drying temperature ranging from 100° C. to 250° C. and a calcining temperature ranging from 350° C. to 650° C. can be used when drying and calcining the substrate.

Results of evaluations of the NOx trapping catalyst 9 that has been described heretofore will be described based on FIGS. 7 to 24.

Figure 7:
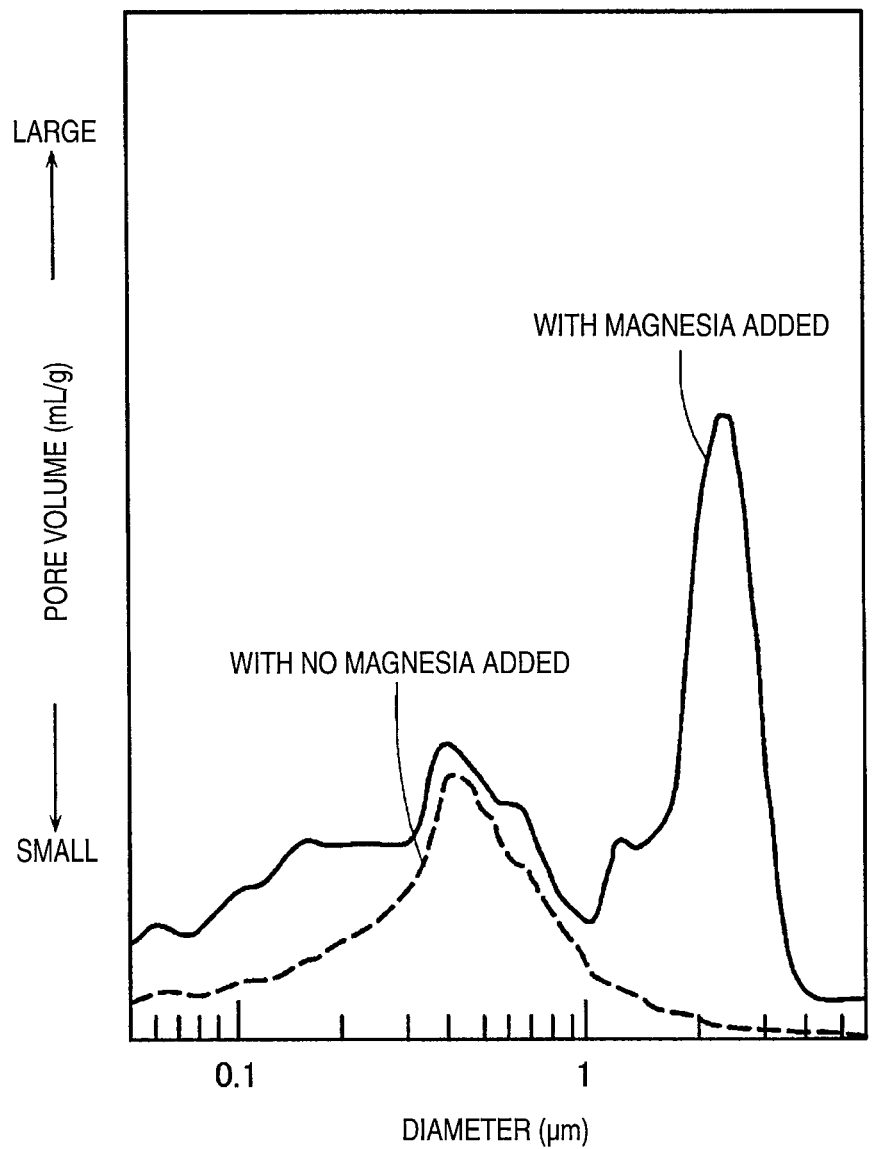
FIG. 7 is a graph representing a relationship between pore volume (axis of ordinate) and pore diameter (axis of abscissa: exponential).
Figure 8:
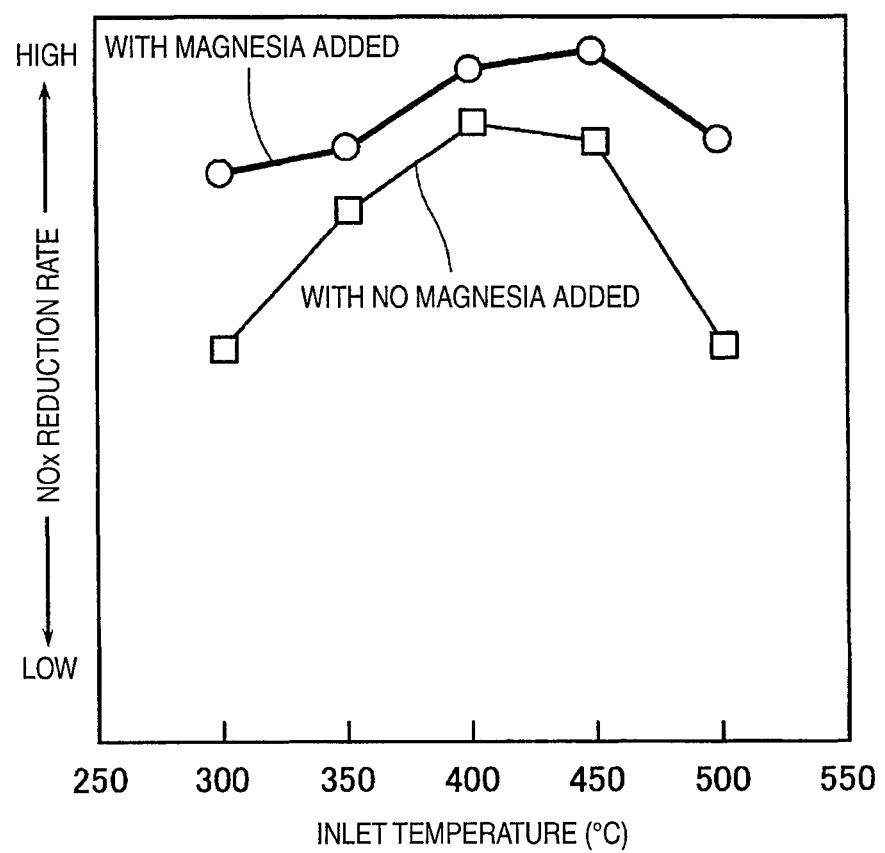
FIG. 8 is a graph representing a relationship between NOx reduction rate and catalyst temperature.

FIG. 7 shows a relationship between pore volume (axis of ordinate) and pore diameter (axis of abscissa: exponential), and FIG. 8 shows a relationship between NOx reduction rate and catalyst temperature.

As is shown in FIG. 7, it is seen that in a case where the minute pores 16 are formed by calcining the coating layer 15 to which MgO is added whose particle size ranges from 0.1 μm to 3.0 μm, compared with a case where no MgO is added, the ratio of the minute pores 16 ranging from 1 μm to 10 μm in pore size is increased, which increases the volume of the minute pores 16.

As is shown in FIG. 8, it is seen that in the event that the volume of the minute pores 16 is increased, the NOx reduction rate is increased in an inlet temperature range from 300° C. to 500° C. In particular, it is seen that with MgO added, the NOx reduction rate is increased in an inlet temperature range from 300° C. to 500° C.

Consequently, it is seen that the NOx reduction rate can be increased by forming pores through addition of MgO.

Figure 9:
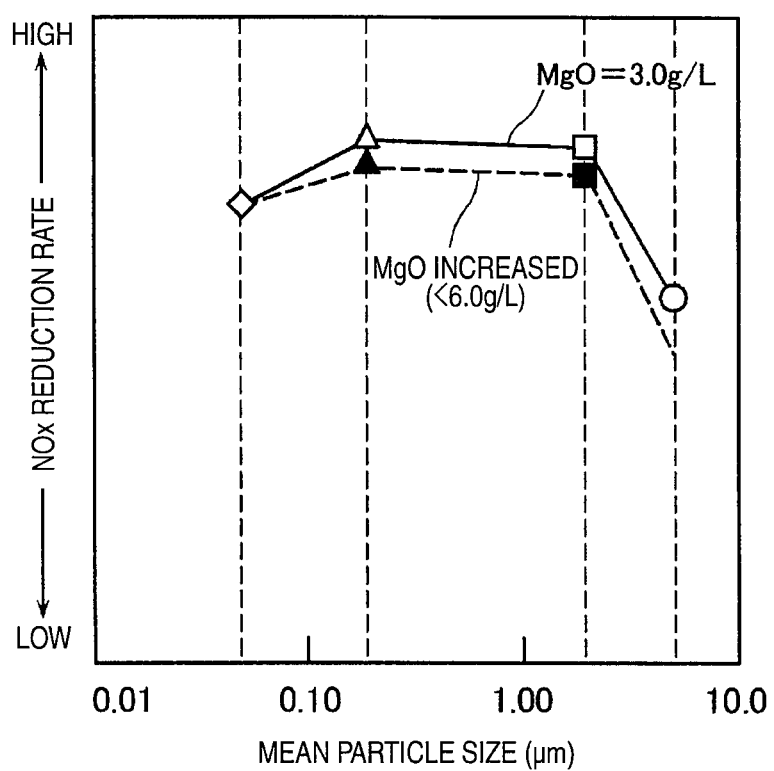
FIG. 9 is a graph representing a relationship between NOx reduction rate (axis of ordinate) and particle size of magnesia (MgO) (axis of abscissa: exponential).
Figure 10:
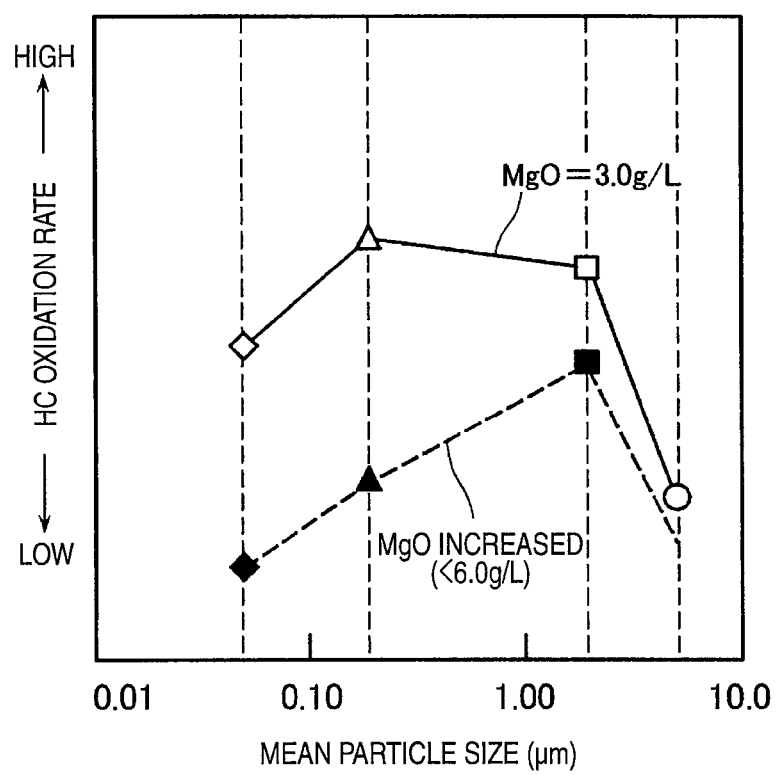
FIG. 10 is a graph representing a relationship between HC oxidation rate (axis of ordinate) and particle size of magnesia (MgO) (axis of abscissa: exponential).

FIG. 9 shows a relationship between NOx reduction rate (axis of ordinate) and particle size of MgO (axis of abscissa: exponential), and FIG. 10 shows a relationship between HC oxidation rate (axis of ordinate) and particle size of MgO (axis of abscissa: exponential). A solid line indicates a case where 3 g/L MgO is added, and a broken line indicates a case where the amount of MgO is increased up to 6 g/L as an upper limit.

As is shown in FIG. 9, it is seen that the NOx reduction rate (%) indicates a high value in a region where MgO is added whose particle size ranged from 0.1 μm to 3.0 μm. Even in the case where MgO is added, the NOx reduction rate (%) indicates a high value in the region where MgO is added whose particle size ranged from 0.1 μm to 3.0 μm.

As is shown in FIG. 10, in a case where MgO is increased up to 6 g/L, compared with the case where MgO is added by 3 g/L, the HC oxidation rate (%) is decreased.

Consequently, it is seen that a NOx trapping catalyst 9 having a high performance can be made by forming minute pores by adding MgO whose particle size ranges from 0.1 μm to 3.0 μm. However, the amount of MgO to be added is preferably less than 6 g/L.

In the NOx trapping catalyst, although the NOx reduction performance increases with increase in amount of K supported, there is caused a problem that the oxidation performance of HC, CO is decreased, and hence, it is important to improve a trade-off between the NOx reduction performance and the HC oxidation performance. Because of this, effects of kinds and amounts of MgO to be added to the NOx trapping catalyst were studied.

Figure 11:
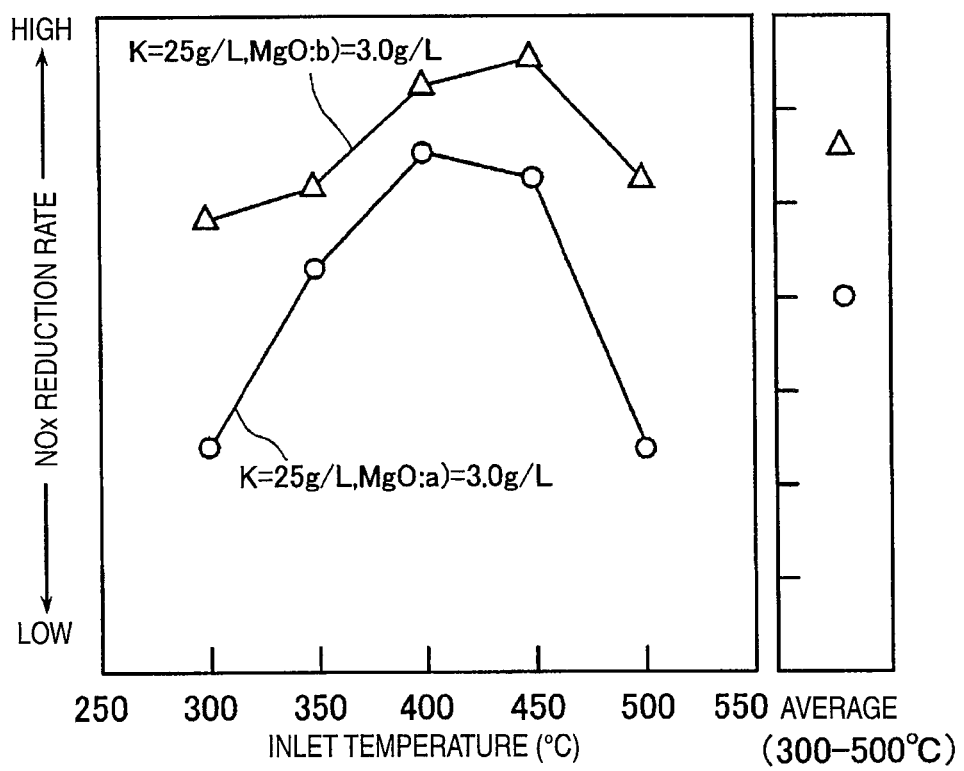
FIG. 11 is a graph representing a relationship between NOx reduction rate (%) and catalyst inlet temperature.
Figure 12:
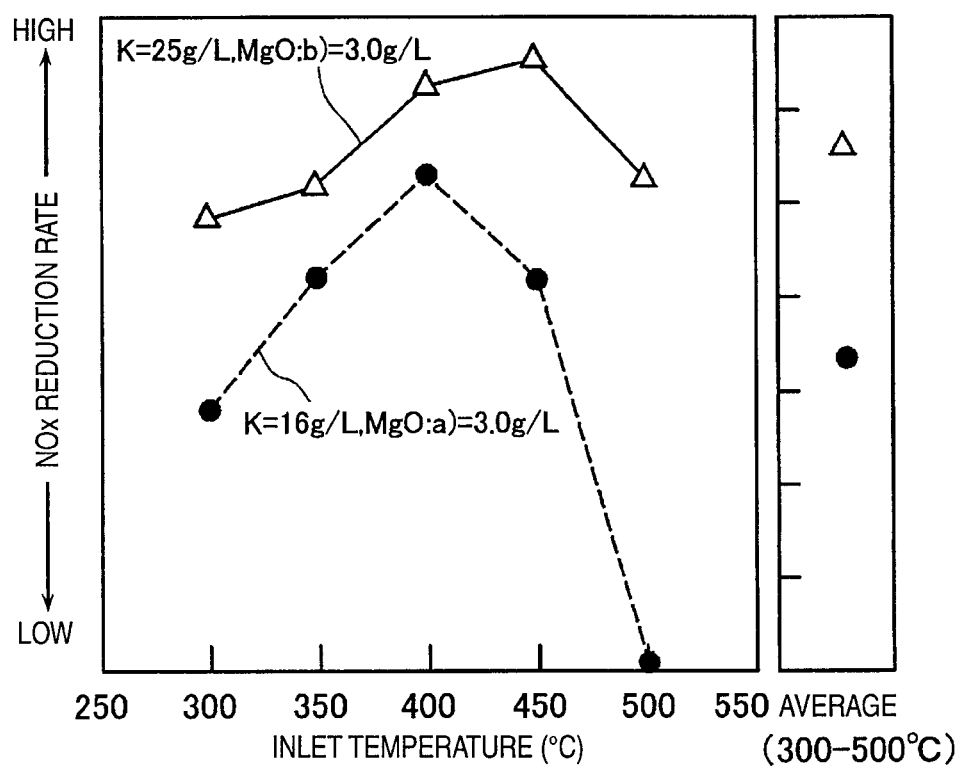
FIG. 12 is a graph representing a relationship between NOx reduction rate (%) and catalyst inlet temperature.
Figure 13:
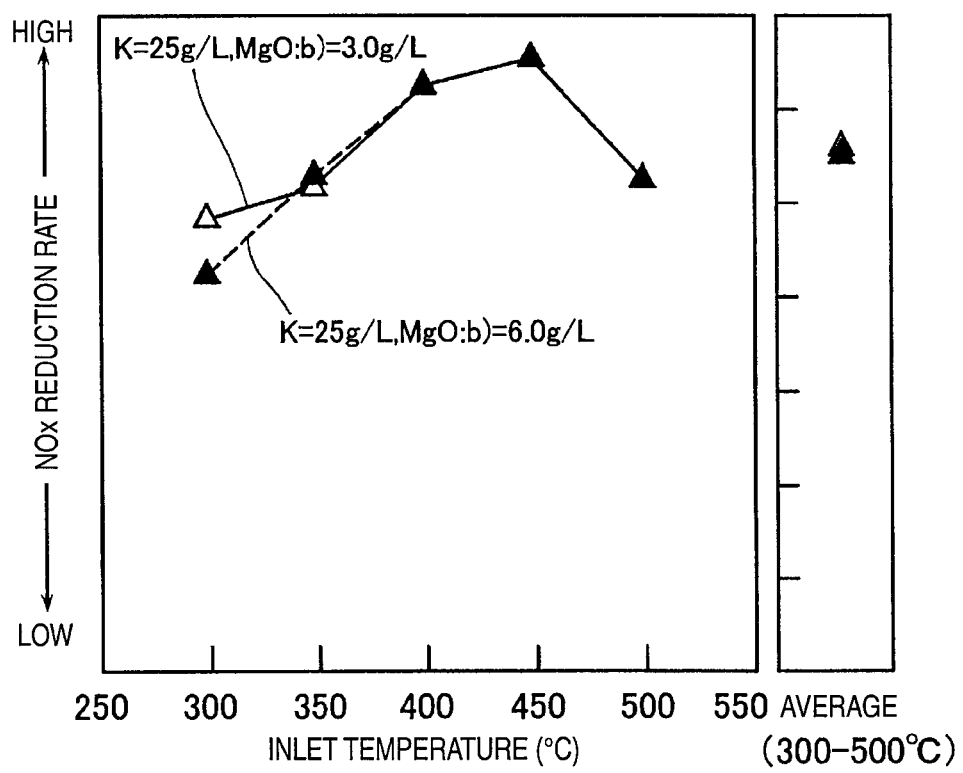
FIG. 13 is a graph representing a relationship between NOx reduction rate (%) and catalyst inlet temperature.
Figure 14:
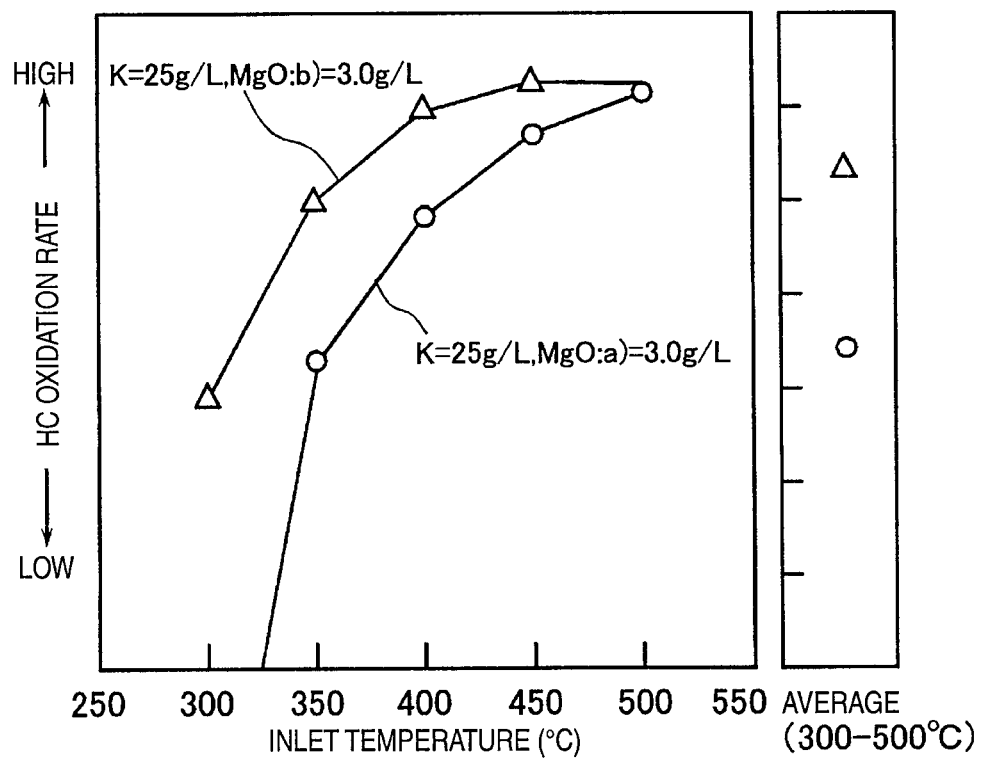
FIG. 14 is a graph representing a relationship between HC oxidation rate (%) and catalyst inlet temperature.
Figure 15:
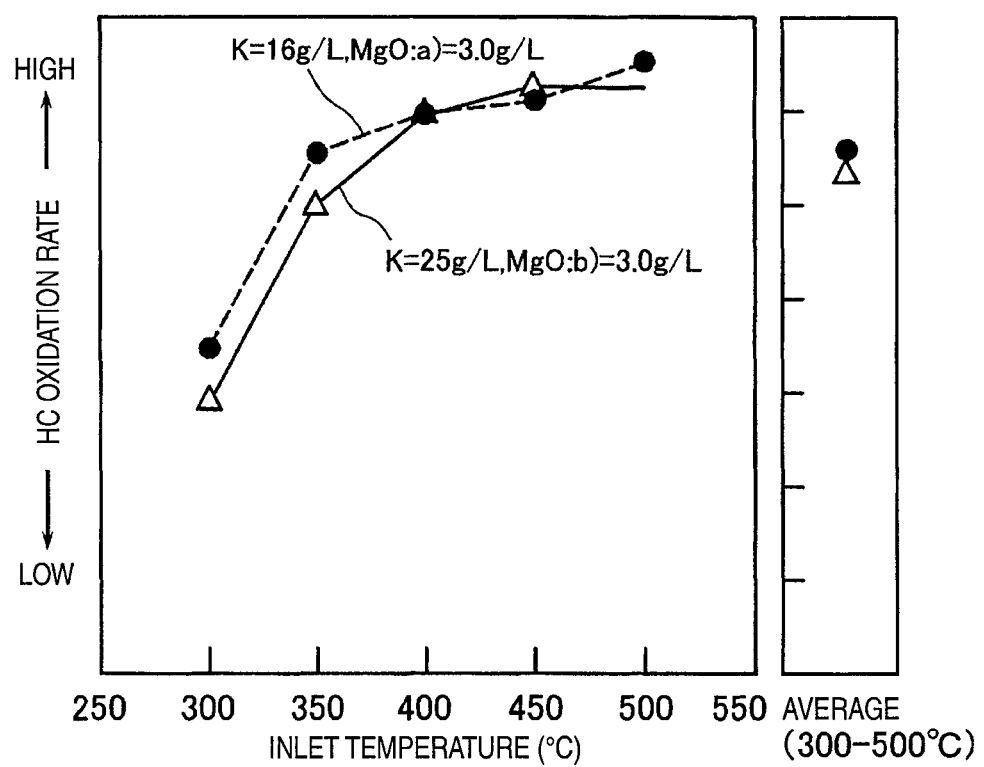
FIG. 15 is a graph representing a relationship between HC oxidation rate (%) and catalyst inlet temperature.
Figure 16:
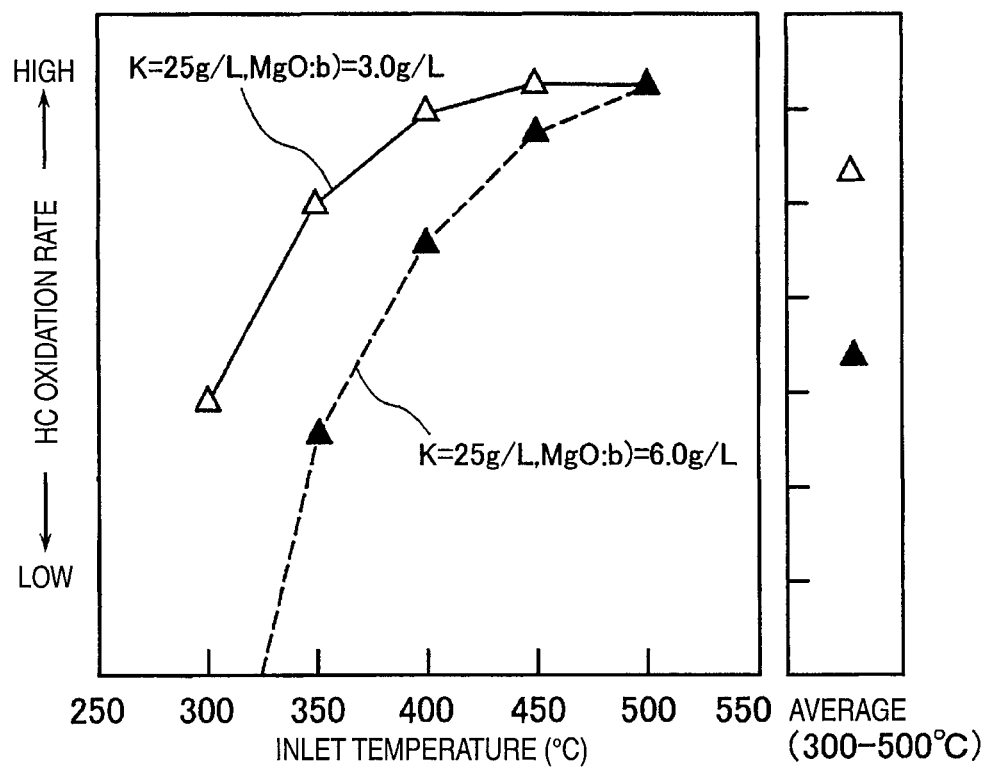
FIG. 16 is a graph representing a relationship between HC oxidation rate (%) and catalyst inlet temperature.

FIGS. 11 to 13 show relationships between NOx reduction rate (%) and catalyst inlet temperature, and FIGS. 14 to 16 show relationships between HC oxidation rate (%) and catalyst inlet temperature. In FIGS. 11 to 16, an average reduction/oxidation rate (%) when the catalyst inlet temperature is in the range from 300° C. to 500° C. is shown in a right-hand frame.

In FIGS. 11 to 16, a series of marks O indicates a catalyst example in which K as a NOx trapping material is 25 g/L and MgO whose particle size is 5.2 μm (a in the figure) is added by 3 g/L. A series of marks Δ indicates a catalyst example in which K is 25 g/L and MgO whose particle size is 0.2 μm (b in the figure) is added by 3 g/L. A series of marks • indicates a catalyst example in which K is 16 g/L and MgO whose particle size is 5.2 (a in the figure) is added by 3 g/L. A series of marks ▲ indicates a catalyst example in which K is 25 g/L and MgO whose particle size is 0.2 μm (b in the figure) is added by 6 g/L.

Firstly, based on FIGS. 11 and 14, when comparing what is indicated by the series of marks O with that by the series of marks Δ, it is seen that both the NOx reduction rate (%) and the HC oxidation rate (%) are higher with the marks Δ. As has been described above, this results from the effect that the NOx reduction rate (%) and the HC oxidation rate (%) can be increased by controlling the particle size of MgO that is added to the NOx trapping catalyst (for example, by employing MgO whose particle size is 0.2 μm).

Next, based on FIGS. 12 and 15, when comparing what is indicated by the series of marks Δ with that by the series of marks •, the NOx reduction rate (%) indicated by the marks Δ is far higher than that indicated by •, and the HC oxidation rates (%) are at the same level. The NOx trapping catalyst indicated by the series of marks • is the catalyst in which K is 16 g/L and MgO is added whose particle size is not appropriate and this can be regarded as a common NOx trapping catalyst which supports a relatively small amount of K.

Consequently, by controlling the particle size of MgO to be added to the NOx trapping catalyst, although with K being 25 g/L, an HC oxidation rate (%) can be obtained which would be obtained with K being 16 g/L.

Lastly, based on FIGS. 13 and 16, when comparing what is indicated by the series of marks Δ with that by the series of marks ▲, it is seen that although the NOx reduction rates (%) are at the same level, the HC oxidation rate (%) indicated by the series of marks ▲ is much lower. As has been described above, this results from the inappropriate addition of MgO, and the amount of MgO to be added to the NOx trapping catalyst should be appropriate, and it is not preferable that the amount of MgO to be added reaches or surpasses 6 g/L.

Consequently, it is seen that the NOx trapping catalyst 9 is allowed to have a high performance by adding MgO by 2 g/L to 5 g/L.

Figure 17:
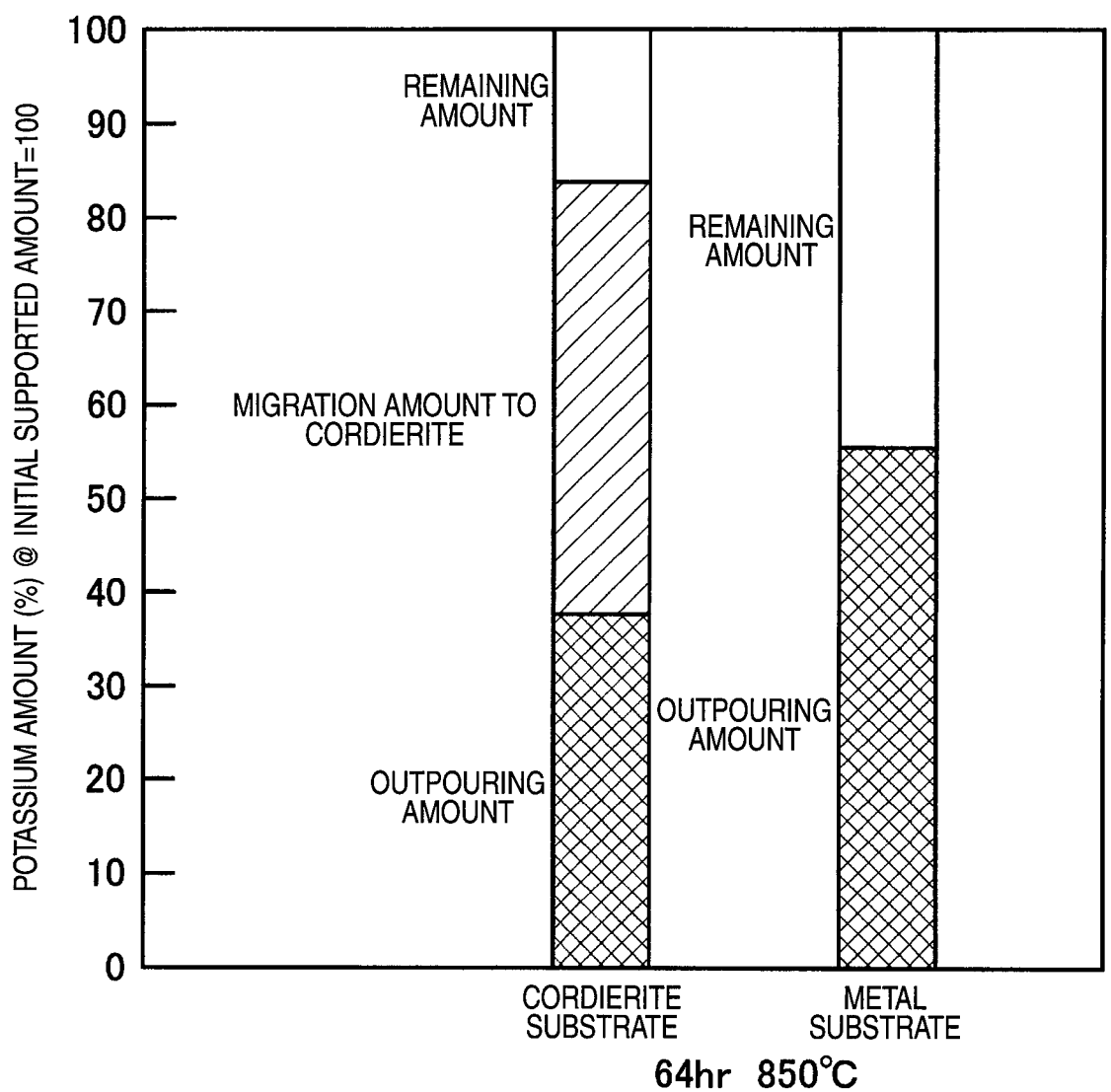
FIG. 17 is a graph representing variation in amount of potassium (K).

FIG. 17 is a graph showing a variation in amount of K. FIG. 17 shows a comparison between a cordierite substrate and a metal substrate and shows specifically conditions of a cordierite substrate and a metal substrate after having been heated at 850° C. for just longer than 64 hours with an initial amount of K regarded as 100.

As is shown in the figure, in the case of the cordierite substrate, it is seen that 80% of the amount of K that is initially supported is lost due to outpouring (the amount of which is shaded with parallel and intersecting slanting lines) and migration to cordierite (the amount of which is shaded with parallel slanting lines) and that the remaining amount (indicated as a blank area) of K is 20% or less. In the case of the metal substrate, only slightly more than 50% of the initial amount is outpoured (with the amount of K so outpoured shaded with parallel and intersecting slanting lines) and nearly 50% of K is remained (the amount of which is indicated as a blank area).

Consequently, it is seen that there occurs such case that no K migrates to combine with cordierite at high temperatures and that much of K that is supported initially can be remained by employing the metal substrate made of the SUS.

Figure 18:
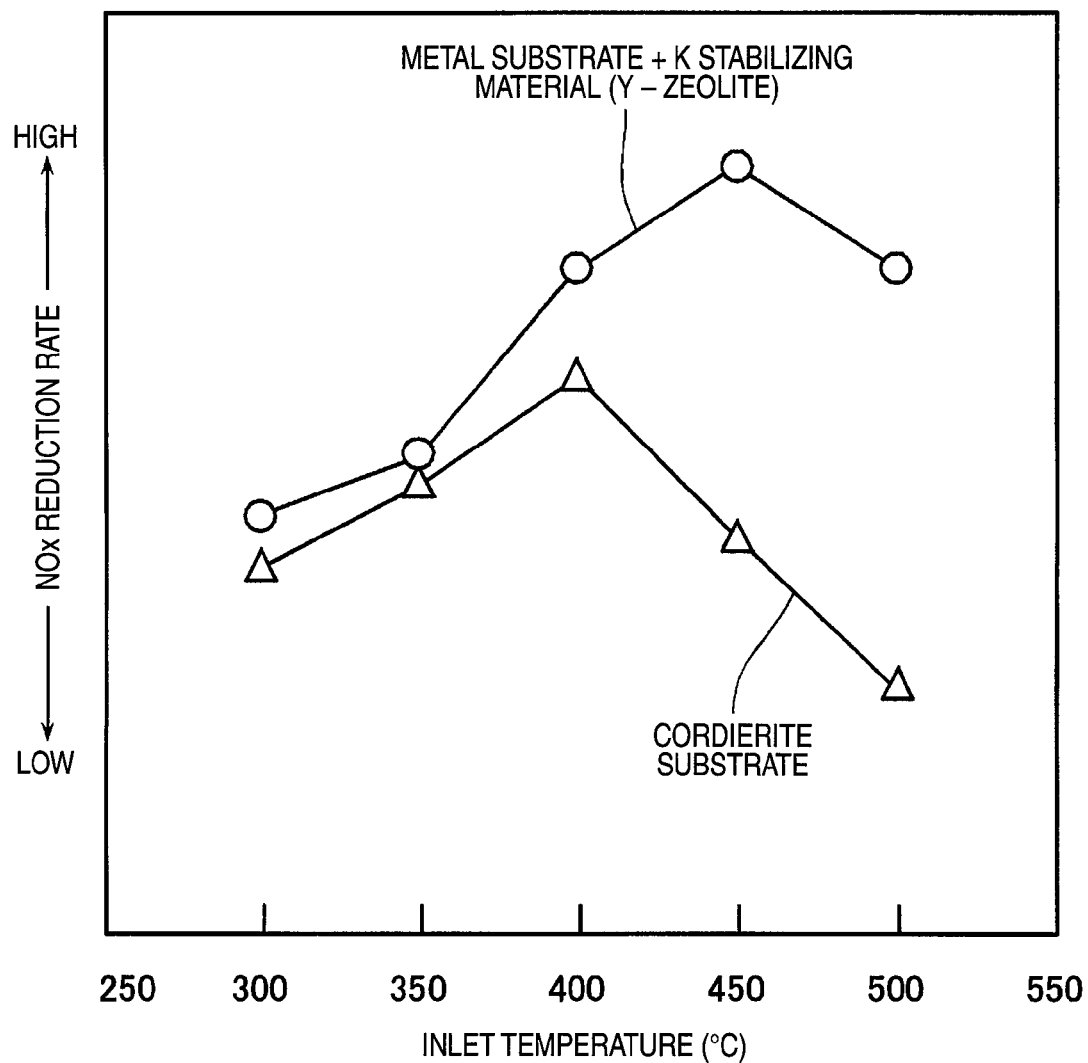
FIG. 18 is a graph representing a relationship between NOx reduction rate (%) and catalyst inlet temperature.

FIG. 18 shows a relationship between NOx reduction rate (%) and catalyst inlet temperature. FIG. 18 shows temperature characteristics resulting when zeolite is added to the metal substrate (which are indicated by a series of marks O.

As is shown in FIG. 18, it is seen that when zeolite is added to the metal substrate, the NOx reduction rate (%) continues to increase even when the inlet temperature reached or surpassed 400° C., and a high NOx reduction rate is maintained even at 500° C. In the case of the cordierite substrate, since the amount of K continuing to stay in the catalyst layer is small as a result of outpouring and migration to the cordierite substrate for combination with cordierite, the NOx reduction rate is decreased drastically at a temperature surpassing 400° C.

Consequently, it is seen that K can be stabilized in the catalyst layer by adding zeolite which functions to stabilize K, thereby making it possible to increase the NOx reduction rate.

Figure 19:
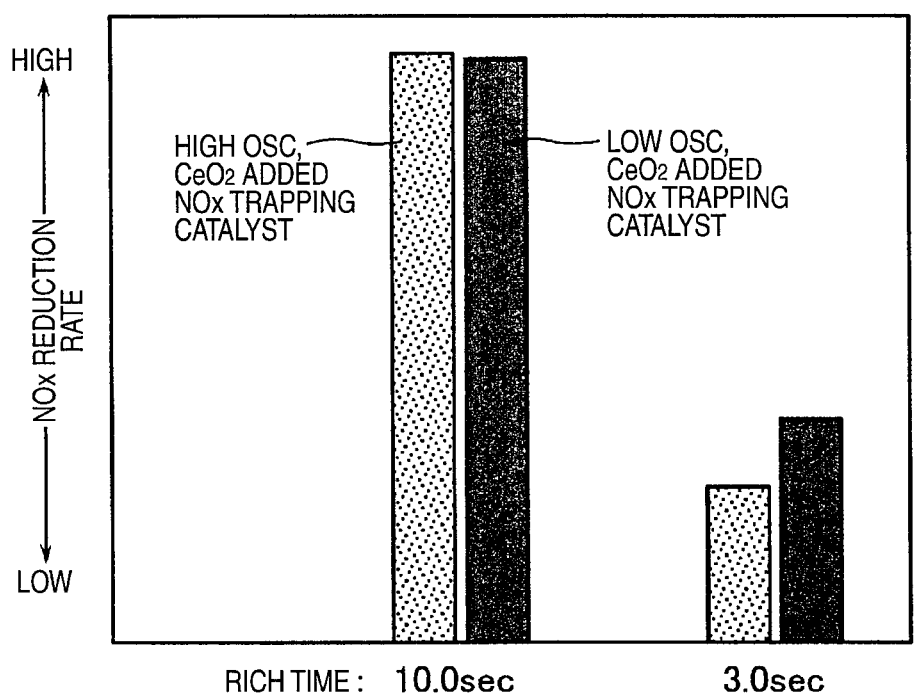
FIG. 19 is a graph representing a relationship between NOx reduction rate (%) and rich time.
Figure 20:
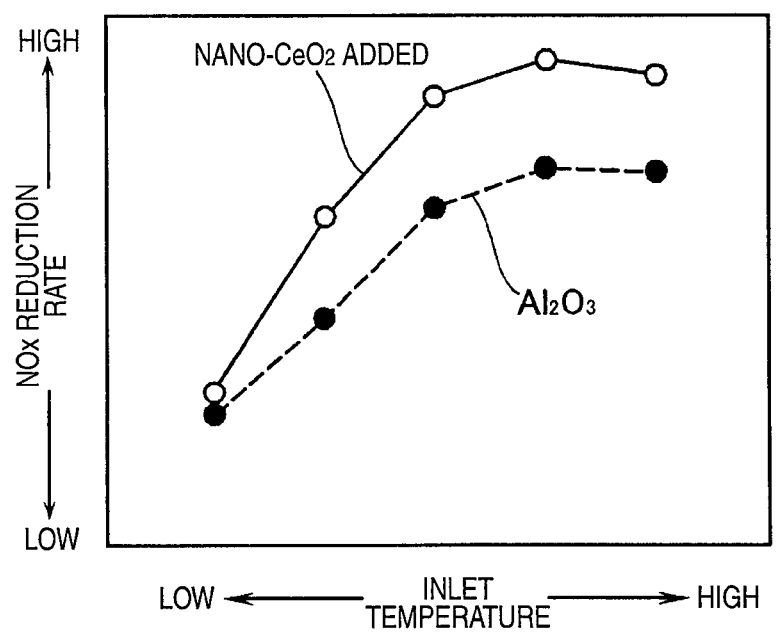
FIG. 20 is a graph representing a relationship between NOx reduction rate (%) and catalyst inlet temperature.

FIG. 19 shows a relationship between NOx reduction rate (%) and rich time, and FIG. 20 shows a relationship between NOx reduction rate (%) and catalyst inlet temperature.

Pt has a property of easily agglomerating (sintering) under a high-temperature atmosphere. The sintering of Pt is largely affected by a support material, and it is known that adding $CeO_2$, in particular, increases the suppression effect of sintering. However, since the addition of a $CeO_2$ material having a large oxygen storage capacity (hereinafter, abbreviated to OSC) promotes consumption of a reduction material in a rich purge, there is caused concern about a negative effect.

Then, it has been found out from results of a study made on effects of addition of $CeO_2$ which has various physical property values that the NOx reduction rate (%) is largely improved by adding a $CeO_2$ (a nano-$CeO_2$ in the figure) to a NOx trapping washcoat, which CeO2 has a primary particle of a single nanosize diameter and a property that the OSC is small.

Consequently, it is seen that the activity of Pt can be increased by supporting a CeO2 whose particle size is minute and which has the property that the OSC is small.

Figure 21:
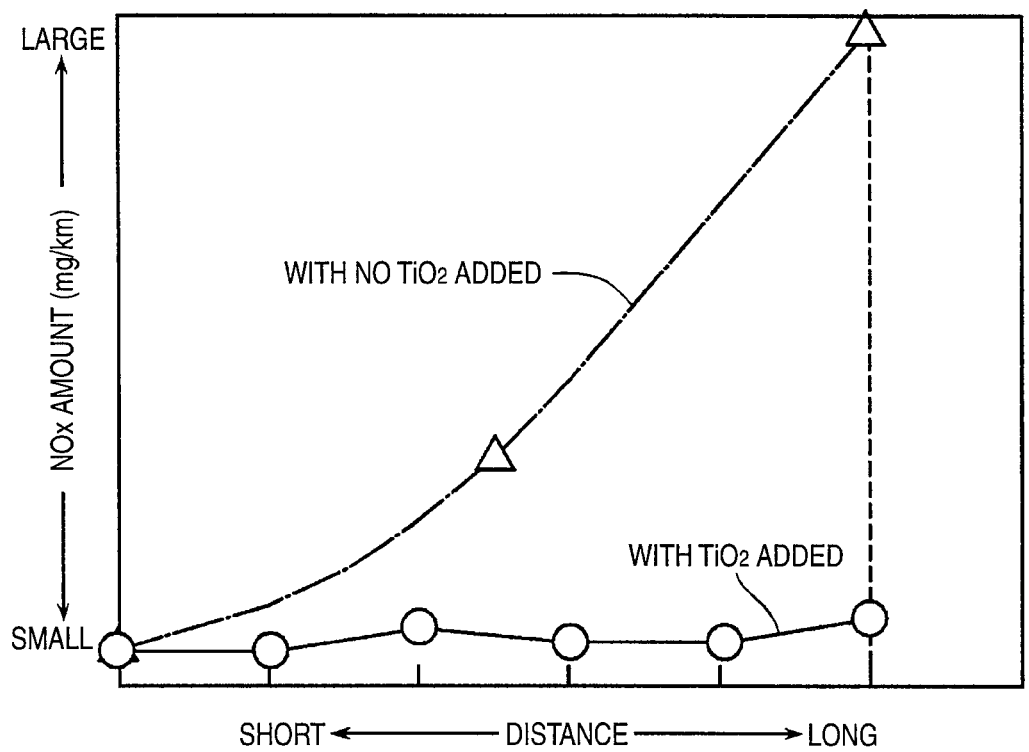
FIG. 21 is a graph representing a relationship between distance over which a vehicle is driven at low-speeds in an urban area and transition of NOx reduction performance.
Figure 22:
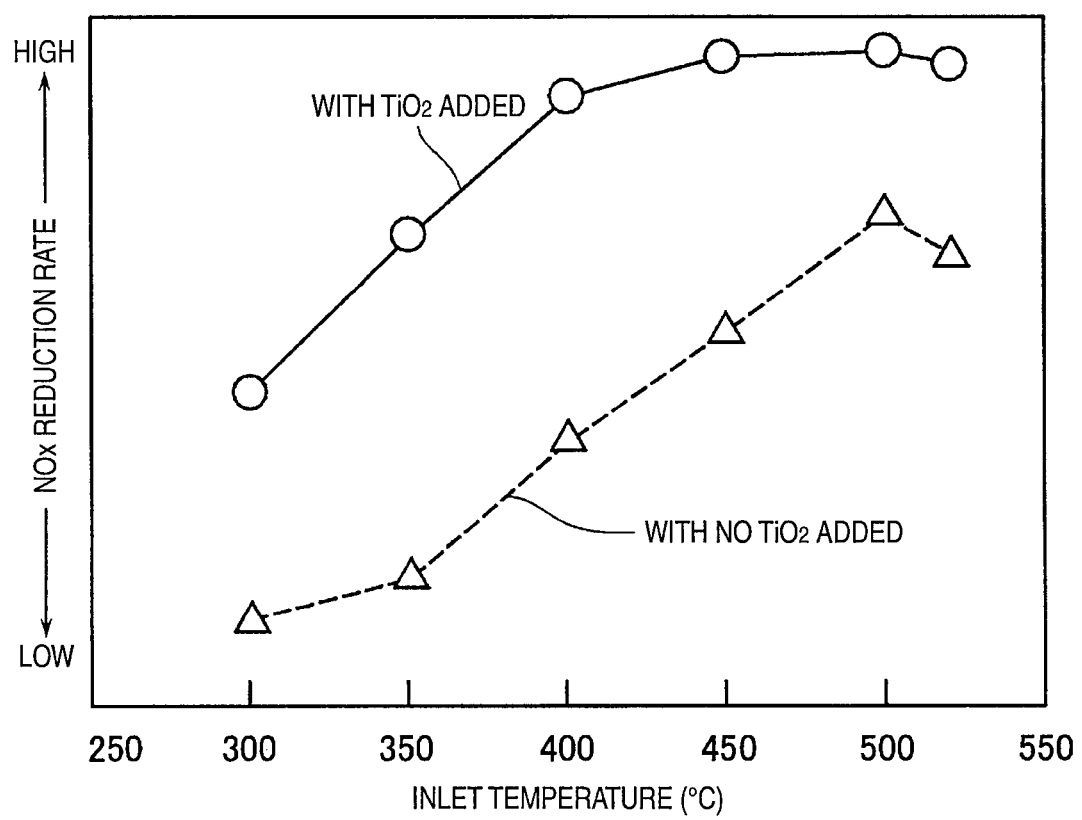
FIG. 22 is a graph representing a relationship between NOx reduction rate (%) and catalyst inlet temperature.
Figure 23:
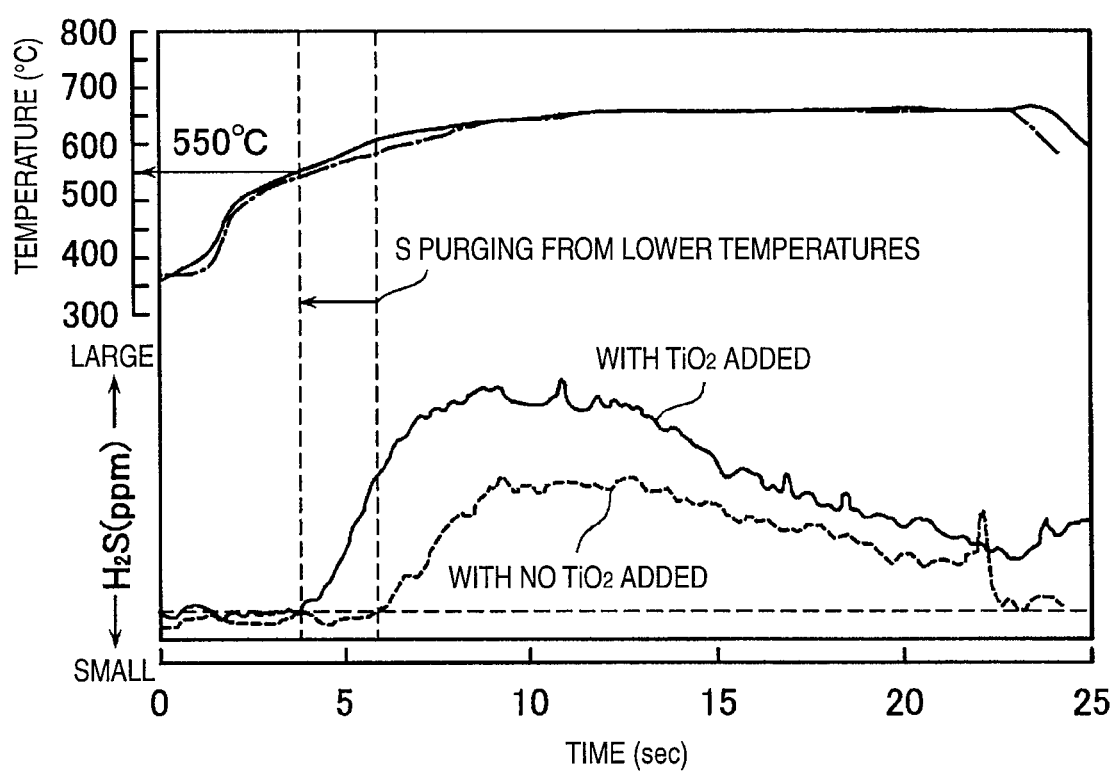
FIG. 23 is a time chart of sulfur (S) purging characteristics.

FIG. 21 shows a transition in amount of NOx emission in relation to a distance over which a low-speed urban driving continues in which the NOx trapping catalyst is poisoned by S. FIG. 22 shows a NOx reduction rate by the NOx trapping catalyst over a distance indicated by a broken line in FIG. 21. In addition, FIG. 23 is a time chart of a sulfur (S) purge property. FIGS. 21 to 23 show that the S poisoning can be suppressed by adding TiO2 to the NOx trapping catalyst.

FIG. 21 shows that an increase in amount of NOx emission in association with an increase in durable running distance of the NOx trapping material to which TiO2 is added can be suppressed largely compared with a NOx trapping catalyst to which no TiO2 is added even though the low-speed urban driving continues in which S tends to be accumulated. FIG. 22 shows a result of a measurement of NOx reduction rate (%) after the vehicle the urban driving mode is performed over the distance indicated by the broken line in FIG. 21. It is seen from the figure that the TiO2 added NOx trapping catalyst is far superior with respect to NOx reduction rate (%).

A factor in ensuring that the TiO2 added NOx trapping catalyst has the far superior NOx reduction performance resides in the fact that S accumulated in the NOx trapping catalyst is desorbed with good efficiency as H2S as the catalyst temperature rises as is shown in FIG. 23. In the case of the NOx trapping catalyst with TiO2 supported therein (indicated by a solid line), desorption of H2S is started at a point in time when the catalyst temperature reaches 550° C., for example. In the case of the NOx trapping catalyst with no TiO2 supported therein (indicated by a broken line), desorption of H2S is started at or after a point in time when the catalyst temperature surpasses 600° C.

Because of this, it is seen that with the NOx trapping catalyst with TiO2 supported therein, S purging can be started from the lower temperatures.

By the S purging being able to be started from the lower temperatures, the S purging can be implemented with good efficiency even in the case of the urban driving mode in which the temperature of the NOx trapping catalyst stays relatively low, thereby making it possible to maintain the NOx reduction performance while suppressing the poisoning by S.

Consequently, it is seen that the poisoning by S can be suppressed by allowing TiO2 to be supported in the NOx trapping catalyst, so as to maintain the NOx reduction performance. Generally, TiO2 has insufficient thermal resistance, and hence, there is caused concern that the specific surface area thereof is reduced after it has managed to endure a severe heated condition, resulting in a reduction in activity. Because of this, as to TiO2 to be added to the NOx trapping catalyst, a TiO2 material having high thermal resistance is preferably used.

Further, MgO whose particle size was 0.2 μm and in which minute pores are formed in the catalyst layers for improvement in exhaust gas diffusivity is added to the TiO2 added NOx trapping catalyst shown in FIGS. 21 and 22, so that the S purging capability by addition of TiO2 could be taken out effectively, as a result of which the NOx trapping catalyst is considered to have held the superior NOx trapping performance.

Figure 24:
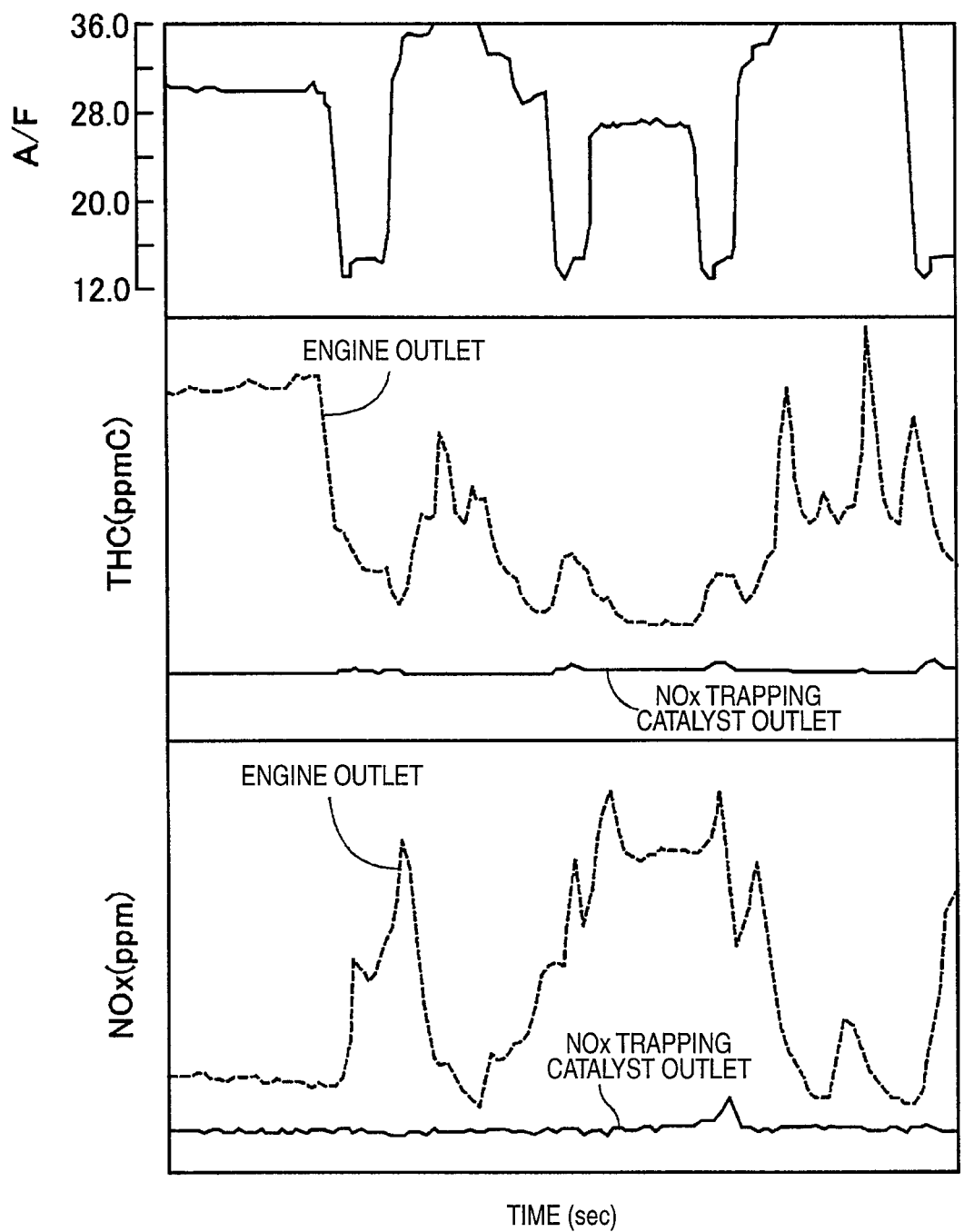
FIG. 24 is a time chart representing the purifying performance of a NOx trapping catalyst.

FIG. 24 shows an exhaust gas purifying performance of the NOx trapping catalyst 9. FIG. 24 shows conditions of concentrations of NOx and THC emissions at the outlet of the engine (indicated by broken lines) and conditions of concentrations of NOx and THC at the outlet of the NOx trapping catalyst 9 (indicated by solid lines).

When the engine runs mainly with a lean air-fuel ratio, it has been relatively easy to oxidize THC at the outlet of the catalyst, whereas it has been difficult to remove NOx with a high reduction rate. However, it is seen that almost no NOx and THC are emitted at the outlet side of the NOx trapping catalyst 9 in which the metal substrate is used and the minute pores are formed in the catalyst layers to improve the NOx reduction rate (%). Namely, it is seen that the NOx reduction rate of 99.5% or more is secured.

While the exhaust gas purifying method of the invention has been described as the NOx trapping catalyst being provided along the exhaust pipe of the in-cylinder direct injection type gasoline engine, the exhaust gas purifying method of the invention can be applied to an exhaust pipe of a diesel engine for use in purifying exhaust gases emitted from the diesel engine.

According to an aspect of the invention, by the pore formation promoting material being added to the NOx trapping material and is then calcined, pores of desired diameters can easily be formed. Even though the catalyst layer becomes thick at acute-angled corner portions within one cell, exhaust gases can be diffused by causing them to flow through the pores, so that the NOx reduction performance of the NOx trapping catalyst can be maintained high.

According to an aspect of the invention, even in the event of the metal substrate being used, the exhaust gas purifying performance can be increased.

The invention can be utilized in an industrial field of exhaust gas purifying methods for removing or reducing NOx in exhaust gases emitted from internal combustion engines.

What is claimed is:

1. A method of purifying an exhaust gas, the method comprising:
    disposing a NOx trapping catalyst in an exhaust pipe of an internal combustion engine,
    the NOx trapping catalyst comprising:
    a metal substrate including cells, a corner portion of each of cells having an acute angle; and
    a catalyst layer supported in the metal substrate, including a noble metal, a heat-resistant inorganic oxide, an NOx trapping material, a pore formation promoting material which includes particles of said pore formation promoting material, and pores having a diameter ranging from 1 μm to 10 μm, with each pore containing therein a particle of said pore formation promoting material, wherein said pores are defined by the noble metal, the heat-resistant inorganic oxide, and the NOx trapping material in the catalyst layer,
    wherein said pores are formed by a calcination process by shrinking said pore formation promoting material from pre-calcination particle sizes with diameters ranging from 0.1 μm to 3.0 μm, and
    the NOx trapping catalyst:
    adsorbing NOx in the exhaust gas when an exhaust air-fuel ratio is in a lean state; and
    desorbing and reducing the adsorbed NOx when the exhaust air-fuel ratio is in a stoichiometric state or a rich state; and
    removing the NOx by the exhaust air-fuel ratio being shifted between the lean state and the rich state.

2. The method according to claim 1, wherein the pore formation promoting material is magnesia (MgO).

3. The method according to claim 1, wherein the NOx trapping material is an alkaline metal or an alkaline earth metal.

4. The method according to claim 3, wherein the alkaline metal or the alkaline earth metal is potassium (K).

5. The method according to claim 4, wherein the catalyst layer includes zeolite which stabilizes the potassium (K).

6. The method according to claim 1, wherein the noble metal is platinum (Pt), and the catalyst layer includes ceria (CeO2).

7. The method according to claim 1, wherein the catalyst layer includes titania which suppresses poisoning by sulfur (S).

8. The method according to claim 1, wherein the internal combustion engine is a direct injection type internal combustion engine in which fuel is injected directly in a combustion chamber for lean burning, a three-way catalyst is disposed downstream of the NOx trapping catalyst, and a catalyst layer of the three-way catalyst includes a trapping material for trapping NOx.

9. An exhaust purifying catalyst which is disposed in an exhaust pipe of an internal combustion engine, the exhaust purifying catalyst comprising:
   a metal substrate including cells, a corner portion of each of cells having an acute angle; and
   a catalyst layer supported in the metal substrate, including a noble metal, a heat-resistant inorganic oxide, an NOx trapping material, a pore formation promoting material which includes particles of said pore formation promoting material, and pores having a diameter ranging from 1 μm to 10 μm, with each pore containing therein a particle of said pore formation promoting material, wherein said pores are defined by the noble metal, the heat-resistant inorganic oxide, and the NOx trapping material in the catalyst layer,
   wherein said pores are formed by a calcination process by shrinking said pore formation promoting material from pre-calcination particle sizes with diameters ranging from 0.1 μm to 3.0 μm, and
   wherein the exhaust purifying catalyst adsorbs NOx in an exhaust gas when an exhaust air-fuel ratio is in a lean state, and desorbs and reduces the adsorbed NOx when the exhaust air-fuel ratio is in a stoichiometric state or a rich state.

* * * * *

UNITED STATES PATENT AND TRADEMARK OFFICE
CERTIFICATE OF CORRECTION

PATENT NO. : 8,938,953 B2
APPLICATION NO. : 12/607420
DATED : January 27, 2015
INVENTOR(S) : Kinichi Iwachido et al.

It is certified that error appears in the above-identified patent and that said Letters Patent is hereby corrected as shown below:

ON THE TITLE PAGE:

At item (73), Assignees, change:

"(73) Assignees: Mitsubishi Jidosha Kogyo Kabushiki Kaisha, Tokyo (JP); ICT Co., Ltd., Osaka (JP); Umicore Shokubai Japan Co., Ltd., Auburn Hills, MI (US)."

to: --(73) Assignees: Mitsubishi Jidosha Kogyo Kabushiki Kaisha, Tokyo (JP); Umicore Shokubai Japan Co., Ltd., Tokyo (JP); Umicore Shokubai USA Inc., Auburn Hills, MI (US)--.

Signed and Sealed this
Twenty-second Day of December, 2015

Michelle K. Lee
*Director of the United States Patent and Trademark Office*